United States Patent
Read et al.

(10) Patent No.: US 8,899,622 B2
(45) Date of Patent: Dec. 2, 2014

(54) INTERNALLY COLLAPSIBLE STEERING COLUMN ASSEMBLY

(71) Applicant: NSK Americas, Inc., Ann Arbor, MI (US)

(72) Inventors: Simon Read, Dexter, MI (US); Victor C. Martinez, Ann Arbor, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

(21) Appl. No.: 13/788,637

(22) Filed: Mar. 7, 2013

(65) Prior Publication Data

US 2013/0233117 A1 Sep. 12, 2013

Related U.S. Application Data

(60) Provisional application No. 61/608,711, filed on Mar. 9, 2012.

(51) Int. Cl.
- *B62D 1/18* (2006.01)
- *B62D 1/19* (2006.01)
- *B62D 1/181* (2006.01)

(52) U.S. Cl.
CPC ............... *B62D 1/192* (2013.01); *B62D 1/181* (2013.01); *B62D 1/195* (2013.01)
USPC ............... 280/777; 280/775; 74/492; 74/493

(58) Field of Classification Search
CPC .......... B62D 1/19; B62D 1/192; B62D 1/195; B62D 1/181; B62D 1/185; B62D 1/187; B62D 1/189; F16F 7/12; F16F 7/123; F16F 7/125
USPC .................... 280/775, 777; 74/492, 493, 527; 188/371, 377, 376; 296/181.05, 296/193.02, 70
See application file for complete search history.

(56) References Cited

U.S. PATENT DOCUMENTS

| 4,785,684 A * | 11/1988 | Nishikawa et al. ............. 74/493 |
| 5,477,744 A | 12/1995 | Hoblingre et al. |

(Continued)

FOREIGN PATENT DOCUMENTS

| EP | 0705754 A1 | 4/1996 |
| EP | 1555188 A1 | 7/2005 |

(Continued)

OTHER PUBLICATIONS

International Search Report and Written Opinion, PCT/US2013/029761, dated Apr. 3, 2014.

(Continued)

*Primary Examiner* — Paul N Dickson
*Assistant Examiner* — Darlene P Condra
(74) *Attorney, Agent, or Firm* — The Dobrusin Law Firm, PC

(57) ABSTRACT

A steering column assembly for an automotive vehicle that includes an inner column tube, a steering shaft supported at least in part by the inner column tube and having a longitudinal axis, a top bracket adapted for receiving a least a portion of the steering shaft and for mounting the steering column assembly within the automotive vehicle, and a telescoping motor subassembly adapted for selectively driving the steering shaft in a fore or aft direction. A telescoping motor subassembly mounting structure is coupled during normal operation to a column housing, the telescoping motor subassembly and the inner column tube, wherein the telescoping motor subassembly mounting structure is adapted to detach from the column housing in the event of an impact exceeding a predetermined first impact load. A plastically deformable energy absorption device is adapted to be carried least partially by the telescoping motor subassembly mounting structure and is fixed in place relative to the column housing during normal operation for maintaining the steering column assembly in an operational position. The energy absorption device absorbs energy by plastic deformation during impact after the telescoping motor subassembly starts to translate along the column housing, and wherein during the impact, the column housing remains in a fixed position.

16 Claims, 7 Drawing Sheets

(56) References Cited

U.S. PATENT DOCUMENTS

| | | | |
|---|---|---|---|
| 5,520,416 A * | 5/1996 | Singer et al. | 280/775 |
| 5,547,221 A | 8/1996 | Tomaru et al. | |
| 5,690,362 A | 11/1997 | Peitsmeier et al. | |
| 5,961,146 A | 10/1999 | Matsumoto et al. | |
| 6,224,104 B1 | 5/2001 | Hibino | |
| 6,264,239 B1 | 7/2001 | Link | |
| 6,394,241 B1 * | 5/2002 | Desjardins et al. | 188/376 |
| 6,685,225 B2 | 2/2004 | Hancock et al. | |
| 7,198,296 B2 * | 4/2007 | Sadakata et al. | 280/775 |
| 7,228,755 B2 * | 6/2007 | Armstrong et al. | 74/493 |
| 7,258,365 B2 | 8/2007 | Kahlenberg et al. | |
| 7,264,274 B2 * | 9/2007 | Ridgway et al. | 280/777 |
| 7,275,765 B2 * | 10/2007 | Camp et al. | 280/777 |
| 7,322,610 B2 | 1/2008 | Ishida et al. | |
| 7,332,610 B2 | 2/2008 | Han et al. | |
| 7,350,816 B2 | 4/2008 | Ishida et al. | |
| 7,410,190 B2 | 8/2008 | Sawada et al. | |
| 7,422,239 B2 * | 9/2008 | Ishibashi et al. | 280/777 |
| 7,441,807 B2 * | 10/2008 | Yoshimoto et al. | 280/777 |
| 2002/0124677 A1 * | 9/2002 | Tomaru et al. | 74/493 |
| 2006/0191368 A1 * | 8/2006 | Sawada et al. | 74/495 |
| 2006/0266151 A1 | 11/2006 | Avers et al. | |
| 2007/0068311 A1 * | 3/2007 | Shimoda et al. | 74/493 |
| 2007/0137381 A1 * | 6/2007 | Arihara | 74/493 |
| 2008/0156138 A1 * | 7/2008 | Tomaru et al. | 74/493 |
| 2011/0314954 A1 * | 12/2011 | Matsuno et al. | 74/493 |

FOREIGN PATENT DOCUMENTS

| | | |
|---|---|---|
| EP | 1693279 A1 | 8/2006 |
| EP | 2465751 | 6/2012 |

OTHER PUBLICATIONS

Co-Pending International Application, PCT/US2013/029761, filed Mar. 8, 2013.

International Preliminary Report on Patentabililty, PCT/US2013/029761, dated Aug. 19, 2014.

* cited by examiner

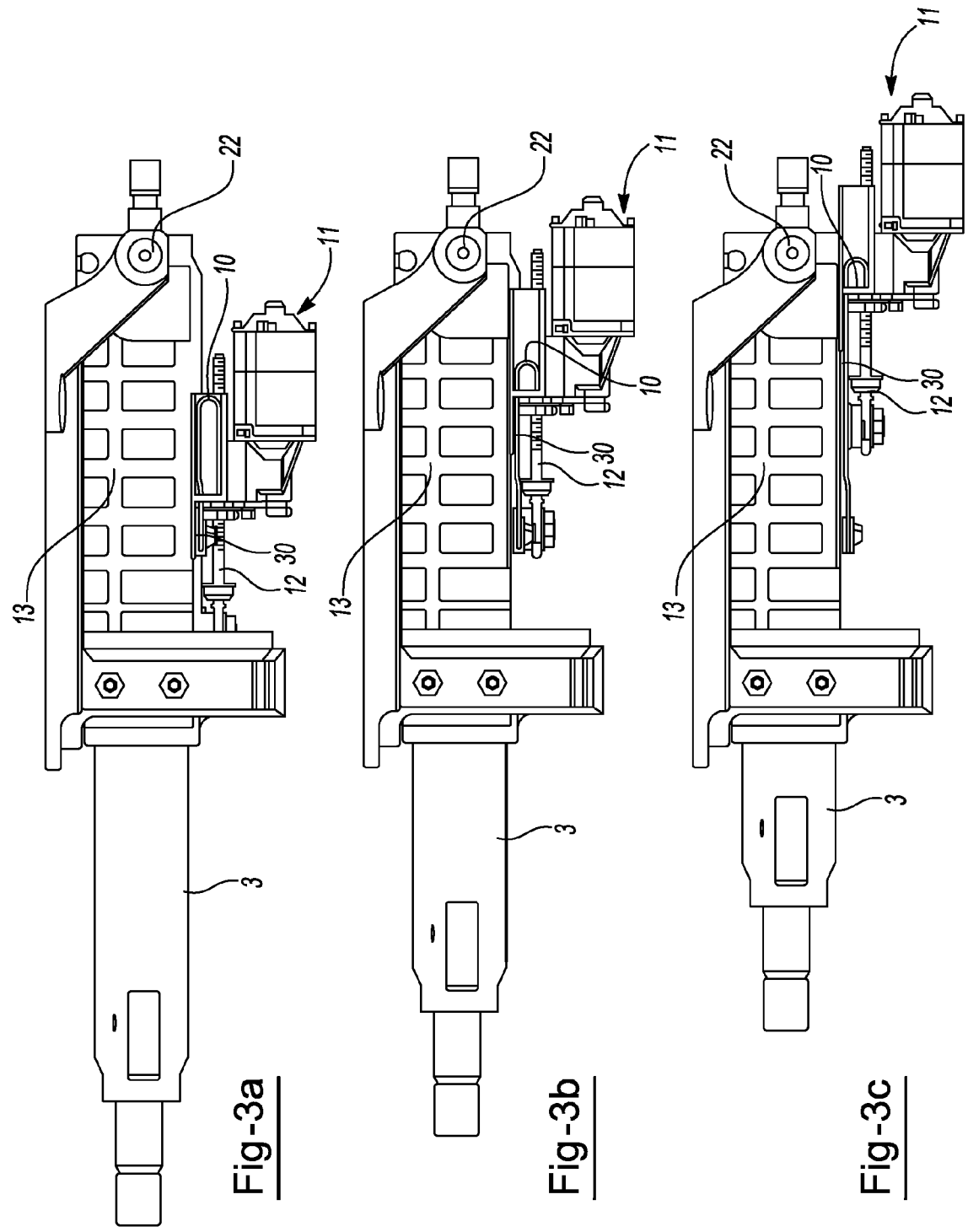

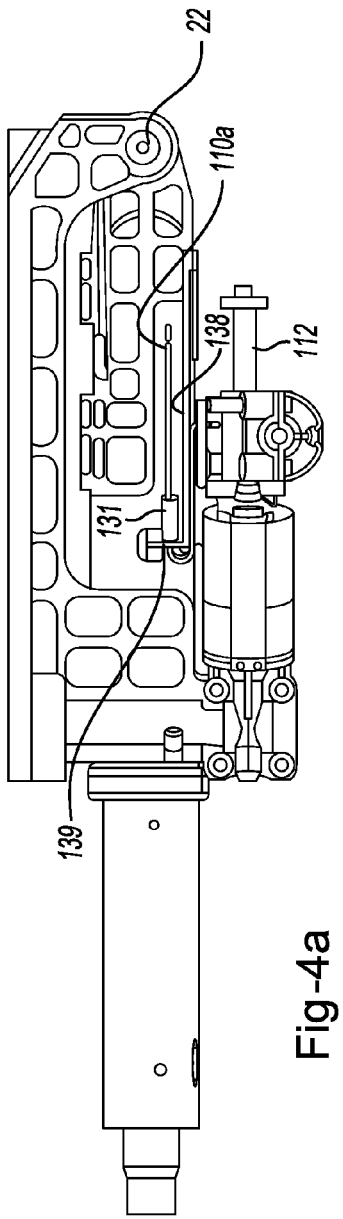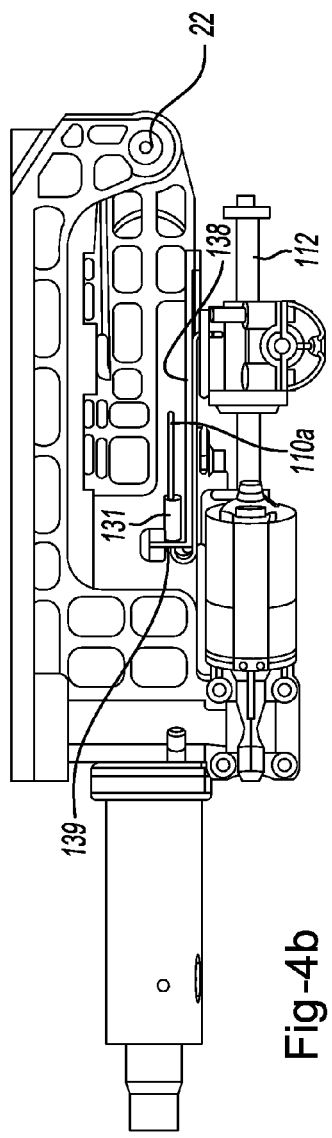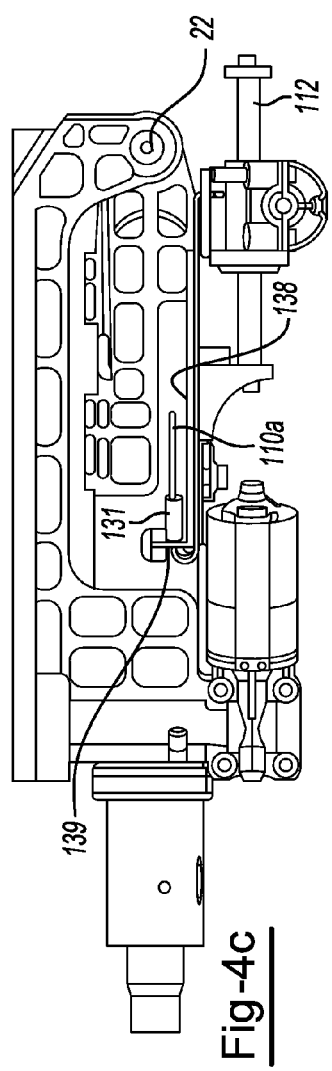

INTERNALLY COLLAPSIBLE STEERING COLUMN ASSEMBLY

CLAIM OF BENEFIT OF FILING DATE

The present application claims the benefit of the filing date of U.S. Application No. 61/608,711, filed Mar. 9, 2012, which is hereby incorporated by reference in its entirety.

FIELD OF THE INVENTION

In general, the present teachings relate to an improved collapsible steering column assembly and methods associated with the same (e.g., methods of providing energy absorption, such as in a secondary impact). More particularly, though having aspects making it adaptable to external collapsing column systems, the present teachings are directed mainly at an internal collapsing tilt and motorized telescopically adjustable steering column system.

BACKGROUND OF THE INVENTION

In the field of automotive vehicles it has become popular to employ steering column assemblies that include tilt and telescoping functions, such assemblies being known also as "reach and rake steering column assemblies". The use of motors to translate a steering wheel relative to a vehicle operator also has seen increased use.

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to protect drivers from such secondary impacts, it has become common practice to use an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but will remain fixed to the vehicle at the one or more fixation points.

For many applications, steering column assemblies incorporate both tilt and telescopic functions. For these, it is common to employ motors to perform each function. For example, one motor may be operated to actuate the steering column assembly generally in an upward or downward vertical direction to adjust the height of a steering wheel relative to an operator of the vehicle and thus perform the tilt function. Another motor may be operated to actuate the steering column assembly to adjust the fore/aft position of the steering wheel relative to the vehicle operator. The latter typically achieves the adjustment by way of translation of a telescopic tubing arrangement by which at least one tube associated with the steering wheel translates relative to a shaft for steering.

For improving upon existing collapsible steering column assemblies (and especially internal collapsing systems), as compared with typical existing systems, it is desired for an acceptable solution to include some or all advantages as compared with existing assemblies, such as reduced weight, reduced number of components, reduced "footprint", a collapse stroke of at least about 70 mm (e.g., about 80 to 100 mm or more), or a structural platform that allows tunability and/or variability to allow the use of common parts to meet differing performance specifications for different vehicles, but otherwise requires minimal hardware substitution.

The following U.S. patent documents may be related to the present invention: U.S. Pat. Nos. 5,547,221; 5,690,362; 5,961,146, 6,264,239; 6,224,104; 5,477,744; 7,322,610; 7,350,816; 6,685,225; 7,410,190; and 7,258,365, all of which are incorporated by reference herein for all purposes. European application No. EP 1555188A1 also may have teachings related to the present invention and is incorporated by reference herein.

SUMMARY OF THE INVENTION

The present teachings make use of a simple, yet elegant, construction approach by which relatively few components can be employed for achieving an adjustable steering column assembly (and particularly an internally collapsing assembly) that exhibits good energy absorption characteristics, especially during a secondary impact.

In general, the present teachings make use of a steering column arrangement in which there is included a housing (typically made of metal, such as aluminum, which may be cast) adapted for attaching to a structure (e.g., a cross car beam, instrument panel or both) of an automotive vehicle. A displaceable inner tube is configured to receive a steering shaft. A telescoping actuator device (which may be a part of a telescoping motor assembly), such as an electric motor, is operatively attached to the housing and to the inner tube by way of one or more drive member (e.g., a rod) in a manner that allows the inner tube to be actuated selectively in a fore or aft direction by a vehicle operator. The assembly is also such that it allows the telescoping motor assembly to break away from its attachment to the housing, in a controlled manner using one or more energy absorption device elements, which elements may be selected on the basis of a particular vehicle application, and may be designed for varying or tuning the desired response (e.g., timing of detachment and/or plastic deformation during a collapse stroke). During a secondary impact event the force of the impact by the vehicle operator is thus transmitted through by the steering shaft to the inner tube and the drive member, causing initial disengagement of the telescoping motor assembly. Additional energy from the impact is absorbed by one or more energy absorption elements that are situated relative to (e.g., operatively between) the telescoping motor assembly and the inner tube, the housing or both. The one or more energy absorption device elements are configured (e.g., as a generally folded and relatively thin strip that is capable of plastically deforming) and the material selected (e.g., a plain carbon steel, a steel alloyed with one or more other metals, or some other steel or metal) so that they plastically deform to absorb impact energy. Such plastic deformation may be deformation in the absence of elongation; thus it is possible that the strip will be folded upon itself and be constrained so that it either gets pulled around an edge of a structure (e.g., a flange) or pushed against a wall for causing the deformation. In this manner, it may be possible to achieve a load and displacement relationship that may include a first stage, in which as load increases displacement increases to a peak displacement corresponding with initial disengagement of the telescoping motor assembly. In a following stage, after a possible energy absorption load delay (which delay may be selectively adjusted by the shape, size or other characteristic of the energy absorption device elements), reliance upon the one or more energy absorption device elements occurs as energy from the load is primarily absorbed by way of deformation (including plastic deformation) of the energy absorption device elements.

Without intending to be limited by the following, in one aspect, the teachings herein make use of a unique combination of components defining a steering column assembly. The assembly includes an inner column tube, with a steering shaft supported at least in part by the inner column tube and having a longitudinal axis. A top bracket is adapted for receiving at least a portion of the steering shaft and is also adapted for mounting the steering column assembly within the automotive vehicle (e.g., by attaching to a cross-vehicle beam, an instrument panel assembly, a combination thereof, or the like). A telescoping motor subassembly may be employed and desirably will be adapted for selectively driving the steering shaft (e.g., by way of a rod that may be threaded or have teeth along some or all of its length, or by way of some other drive member) in a fore or aft direction. A tilt subassembly may also be employed and desirably is adapted for selectively raising or lowering the steering shaft (e.g., so that the height position of the steering wheel relative to a vehicle operator can be adjusted). A column housing may be pivotally coupled with the top bracket, and is adapted to permit steering shaft tilt adjustment by way of the tilt subassembly. The column housing is adapted to remain generally fixed in place relative to the top bracket in the event of a secondary impact. Suring such impact, the inner column tube may be adapted to telescopically translate into the column housing.

The system may also include a telescoping motor subassembly mounting structure (e.g., that is coupled during normal operation to the column housing, the telescoping motor subassembly and the inner column tube). For instance, the telescoping motor subassembly may be coupled using a mounting structure that is adapted to detach from the column housing (and possibly slide or otherwise translate along an upper surface of the telescoping motor subassembly along a surface of the column housing (e.g., slide or otherwise translate along a downward facing surface proximate the bottom of the column housing)) in the event of an impact exceeding a predetermined first impact load. The system also may include at least one plastically deformable energy absorption device element (e.g., a bend plate or other device that deforms in a manner that absorbs energy) adapted to be carried (e.g., generally matingly or nestingly, in the case of an h-bracket as described) at least partially within or on the mounting structure. The deformable energy absorption device element desirably may be fixed in place to the column housing during normal operation for maintaining the steering column assembly in an operational position. The energy absorption device element and the telescoping motor subassembly mounting structure are configured and positioned in a manner such that in the event of an impact load, after the telescoping motor subassembly becomes detached and starts to translate it is possible that it will remain tethered to the column housing, but will nonetheless be displaced from its normal operational position and the energy absorption device elements will deform plastically and absorb energy due to the impact load. The energy absorption device elements may be elongated strips (which may include elongated slots) that have an initial folded configuration, in which an end of an element bears against a wall, or in which a surface of the element bears against an edge of a flange or other structure on a concave side of the folded elements. The plastic deformation may be deformation that results as the elements are pushed or pulled from the impact load. As will be appreciated, deformation of the energy absorption device elements without any significant elongational yield (e.g., below about 20%, 10% or even 5% of the original length) may result. Yet there will be plastic deformation as the elements are pulled or pushed and the location of the bend portion along the length of the elements changes.

As will be gleaned from the above and the following, the telescoping motor subassembly includes a housing adapted to carry a motor and may include an upper portion that includes at least one generally horizontal planar surface that include notches at a rearward end of the upper portion. The upper portion opposes a lower portion of the column housing, which lower portion may also include at least one generally planar surface. The energy absorption device element may be carried at least partially by the telescoping motor subassembly. Upon a secondary impact, the telescoping motor subassembly becomes detached initially and thereafter, as it translates along the column housing, energy is absorbed by plastically deforming the energy absorption device element. The energy may be absorbed as the energy absorption device element is pulled in tension and bent around a structure (e.g., a flange of the lower portion of the column housing). The energy may be absorbed as the energy absorption device element is subject to a compressive force against a structure (e.g., as an end of the device element bears against a wall of an h-bracket). As seen, the energy absorption device element may be a folded strip, which folds about a bend. The location of the bend along the length of the strip may change as the strip absorbs energy.

The teachings herein also contemplate methods. For example, the teachings envision a method of managing energy distribution resulting from a secondary impact of a vehicle occupant and an automotive vehicle steering column assembly as described in the above, and as set forth more specifically in the following teachings.

As can be seen, it is believed that by employment of the teachings herein it is possible to achieve an effective adjustable steering column system that (particularly as compared with previous systems) employs some or all of a reduced number of parts involved in a collapse stroke, reduced cast parts, and/or reduced tubing. For example, as will be seen, by integrating a tilt bracket and cross car beam mounting bracket into a single unit (which will remain generally fixed to the cross car beam during a secondary impact) a relatively smaller footprint can be achieved. It will also be seen that advantageous packaging of the system can be achieved by integrating breakaway functionality into the telescoping motor subassembly. As will be gleaned from the teachings herein, it is thus possible to realize a unique assembly (and associated methods) that enable a steering column assembly to transmit steering torque, smoothly rotate, and absorb energy during a secondary impact vehicle collision, while also providing adjustable driving positions.

BRIEF DESCRIPTION OF THE DRAWINGS

FIG. 2a is an exploded perspective view of the assembly of FIG. 1a;

FIGS. 3a-3c are side views of the illustrative embodiment of FIG. 1a showing a progression of the system during a collapse stroke from a first operational position (FIG. 3a) to a second position occurring during occurrence of a secondary impact (FIG. 3b) to a subsequent third position (FIG. 3c);

FIGS. 4a-4c are side views of the illustrative embodiment of FIG. 1b showing a progression of the system during a collapse stroke from a first operational position (FIG. 4a) to a second position occurring during occurrence of a secondary impact (FIG. 4b) to a subsequent third position (FIG. 4c);

DETAILED DESCRIPTION

Figure 1A:
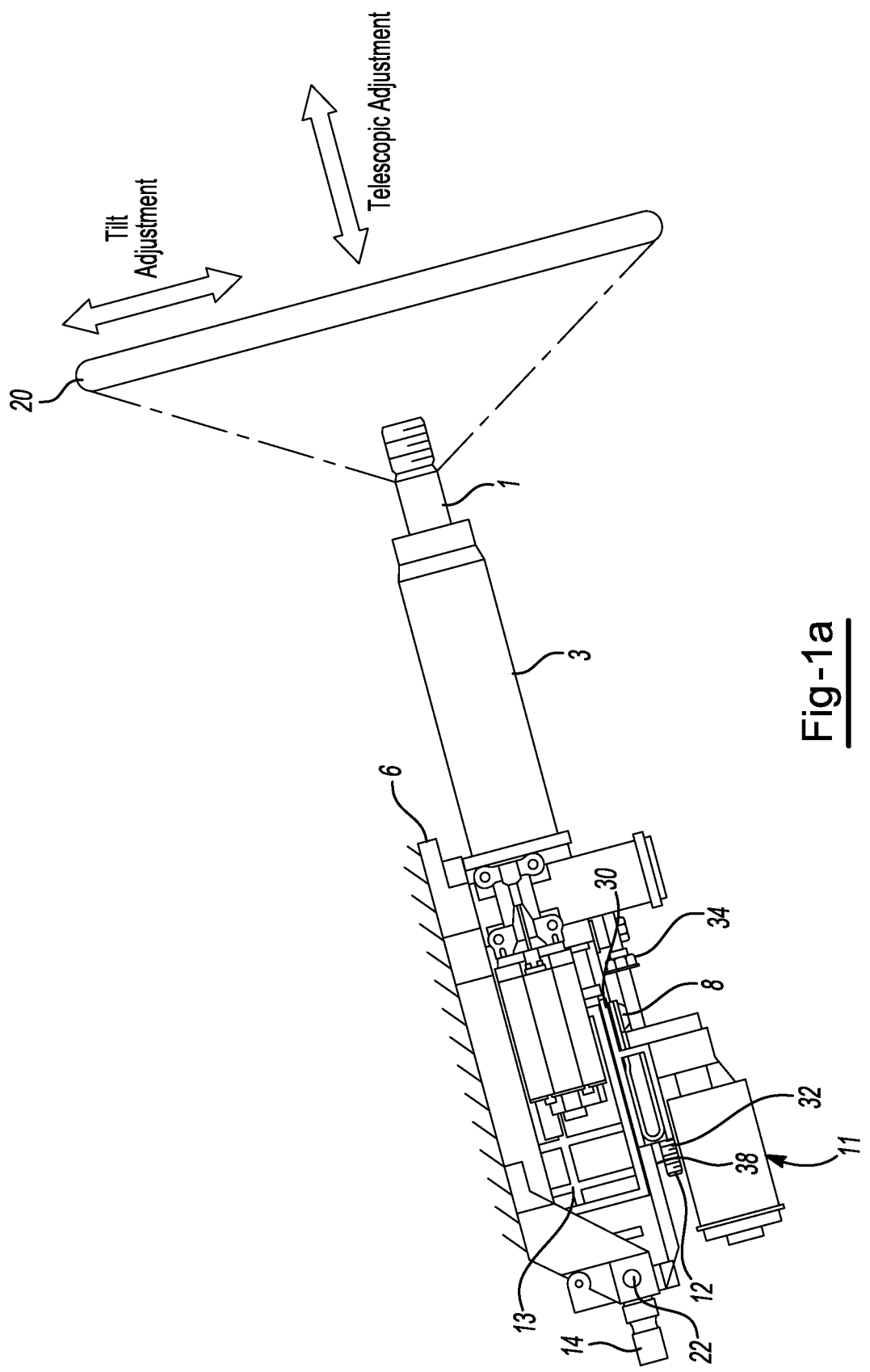
FIG. 1a is a side view of a collapsible steering column assembly of at least one embodiment of the present teachings and having tilt and telescopic adjustment features.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, the teachings herein are directed toward a unique combination of components for a collapsible steering column assembly, and more particularly an internally collapsing steering column assembly for vehicles that have a motorized telescoping functionality. By use of the teachings herein, it is possible to achieve a full collapse stroke of at least about 70 mm, about 80 mm, or even up to at least about 100 mm. The assemblies also make possible a reduced weight system as compared with many other systems in view of the relative simplicity of design. For example, the teachings herein contemplate integrating functions of mounting within a vehicle and accommodating tilt of a column housing within a single component, thereby reducing the number of components and also providing an overall reduced "footprint". The teachings herein also provide a structural platform that allows the use of common parts to meet differing performance specifications for different vehicles, but otherwise requires minimal hardware substitution. That is, like assemblies can be used across a range of vehicles, and can be individually tuned (e.g., by selection of an appropriate energy absorption device to meet the unique requirements of a particular vehicle).

With more attention now to the details of the assemblies herein, they generally will include a tube that is operatively connected with a steering wheel, e.g., via a steering shaft. One such tube, referred to herein an inner column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube may be generally coaxially aligned, aligned generally parallel with a longitudinal axis of a vehicle, or each. The shaft and the inner tube typically will be made of a suitable metal, such as steel or aluminum.

A top bracket may be employed for receiving at least a portion of the steering shaft and for mounting the steering column assembly within the automotive vehicle. The top bracket may include a single unitary structure, or a plurality of components assembled together in an assembly to define a top bracket structure. The top bracket may be a cast structure (e.g., structure made by a casting cast), a forged structure (e.g., a structure made by forging a metal mass), a machined structure, a consolidated structure (e.g., a structure made by a step of sintering and/or pressing a powder metal mass) or any combination thereof. One preferred approach is to cast the top bracket to form an aluminum alloy casting. The top bracket may be configured for integrating functions of mounting within a vehicle and accommodating a tilt function of the assembly relative to a vehicle operator.

The top bracket may include a plurality of ribs. It may include one or more openings through which a fastener may be passed for attaching the bracket to the vehicle. It may include one or more projections, such as for attaching to the vehicle. The top bracket may include an upper surface, at least a portion of which is adapted to abut against the automotive vehicle structure to which it is attached. For example, for attaching to a generally flat cross vehicle beam, instrument panel or both, which is to be disposed above the top bracket, the top bracket may include a generally planar upper surface. Of course, as seen in the drawings, the generally planar upper surface may include or more wells at least partially defined by the ribs that are present. The top bracket may also include a collar portion that projects away from a lower surface of the top bracket. The collar portion may be defined to include a completely closed or at least partially enclosed structure against which the inner column tube may abut. The top bracket may include one or more (e.g., a pair of) pivotal connection arms. For example, at least one pair of arms may be disposed toward a forward end of the top bracket. The arms may include a portion that extends beyond a forward end of the upper surface. The arms may include one or more openings for receiving a fastener that penetrates through the arm and into a column housing. The top bracket may also include a housing structure, a flange structure or both for receiving a motorized tilt subassembly, a telescoping motor subassembly, an energy absorption device or any combination thereof. The collar portion may have an asymmetric structure, such as that depicted herein as resembling a capital letter "D", within which one or more components (e.g., a drive member such as a rod) of a motorized tilt subassembly are received. It may also be "u"-shaped or otherwise configured.

The teachings contemplate employing at least one telescoping motor subassembly adapted for selectively driving the steering shaft (by way of a rod or other drive member) in a fore or aft direction generally along the longitudinal axis of the steering shaft. The telescoping motor subassembly may include an electric motor that has a motor shaft that operatively drives a drive member (e.g., a rod that is threaded or has gear teeth over at least a portion of its length). The shaft may drive the drive member by use of one or more gears. It may drive the drive member by way of a threaded nut. The motor shaft may have a longitudinal axis that is oriented generally parallel with the longitudinal axis of the steering shaft and/or inner tube. The motor shaft may have a longitudinal axis that is oriented generally transverse with the longitudinal axis of the steering shaft and/or inner tube. The telescoping motor subassembly may be such that it includes a housing within which the motor is at least partially located. The housing may include one or more flat surfaces that are adapted to slidingly bear against another surface (e.g., a bracket, a flange of the column housing, or some other mounting structure), which other surface may be part of, or be operably connected with the column housing. Such flat surfaces may be a part of a mounting structure for securing the telescoping motor subassembly to the overall assembly.

The teachings further contemplate employing at least one tilt subassembly that is adapted for selectively raising or lowering the steering shaft. The optional tilt subassembly may be manually actuated, motorized or both. It may be attached (e.g., at a first mount location along its length) to the top bracket. For example, as discussed, it may be incorporated within a housing structure defined in the top bracket. It may be attached at a second location along its length (e.g., at a second mount location that is distal from the upper surface of the top bracket as compared with the first mount location).

As indicated, a column housing is pivotally coupled with the top bracket (e.g., at a forward end of both the top bracket and the column housing) and is adapted to permit steering shaft adjustment (e.g., tilt adjustment, telescopic adjustment or both, such as by way of the tilt subassembly, the telescoping motor subassembly, or both). The column housing may be a cast structure (e.g., a structure made by a casting cast), a forged structure (e.g., a structure made by forging a metal mass), a machined structure, a consolidated structure (e.g., a structure made by a step of sintering and/or pressing a powder metal mass) or any combination thereof. One preferred approach is to cast the column housing to form an aluminum alloy casting. The column housing may include one or more ribs. It may include a structure (e.g., along a side of the housing so that it projects generally radially outward relative to a longitudinal axis of the housing) onto which an energy absorption device of the teachings herein may be secured, or into which an energy absorption device of the teachings herein may be positioned. For example, the column housing may be generally elongated. It may have a substantially cylindrical configuration. It may have a lower portion that has laterally projecting flanges over at least a portion of the column housing length. The flanges may project from both sides of the column housing. The flanges may project laterally outward to a location that extends beyond the outermost reach of the wall from which it projects. The column housing may have one or more openings, e.g., slots, in a lower portion for exposing the inner column tube so that the column tube can be connected with and translate longitudinally with a drive member (e.g., via a suitable bracket) associated with a telescoping motor subassembly. Because the column housing is pivotally connected to the top bracket (e.g., at a forward end of the assembly), in the event of a secondary collision, the column housing will remain generally fixed in its normal operational position.

The teachings contemplate further employing a telescoping motor subassembly mounting structure that is coupled during normal operation to the column housing, the telescoping motor subassembly and the inner column tube. The telescoping motor subassembly mounting structure is adapted to detach from the column housing in the event of an impact exceeding a predetermined first impact load. The telescoping motor subassembly mounting structure may be at least partially integrated with a housing for a motor that forms part of the telescoping motor subassembly mounting structure. The telescoping motor subassembly mounting structure may include an upper portion that has one or more flat surfaces that oppose a bottom surface of the column housing. For example, the telescoping motor subassembly mounting structure may be at least partially integrated with the telescoping motor subassembly (e.g., as part of a motor housing). The telescoping motor subassembly mounting structure may be adapted to slidingly bear against or otherwise translate relative to one or more of the laterally projecting flanges of the column housing after an initial breakaway load has been experienced. The telescoping motor subassembly mounting structure may be adapted to connect with an energy absorption device element and cause the element to plastically deform following an initial breakaway.

By way of illustration, the telescoping motor subassembly mounting structure may be employed with one or more bolts for securing the telescoping motor subassembly relative to the column housing. One or more coating plates may be placed on the mounting structure for allowing release of the mounting structure from the column housing.

The telescoping motor subassembly mounting structure may be such that it can define a pocket into which an energy absorption device element is received. For instance, it may have a pair of opposing spaced apart walls that are connected (which connection may be integrally formed) at an end of at least one of the walls or along the length of one of the walls, to define an opening. The telescoping motor subassembly mounting structure thus may have a shape of a lower case letter "h". It may have a shape of the letter "u" or "c". As seen, the bracket may include a structure that effectively defines a pair of opposing spaced walls each having at least one free end that may be joined at an apex to define the pocket into which at least one plastically deformable energy absorption device element may be inserted. The mounting structure may have a slot or other opening through which an energy absorption device element is passed (e.g., an opening leading from a location outside an h-bracket to a location within the pocket of the h-bracket), such that part of the device element is located within the bracket and part is located outside the bracket. The telescoping motor subassembly mounting structure may include a one or more flanges that bear against the column housing. The telescoping motor subassembly mounting structure may include one or more retention members, such as a hollow member that is configured to slidingly receive an energy absorption device element but which may abut against a wall of a flange of the column housing to help limit longitudinal and/or lateral motion of the energy absorption device element during deformation.

The telescoping motor sub-assembly operates to translate the steering wheel in a fore or aft direction relative to a vehicle operator. It will employ a suitable drive member, such as a rod, that may be operatively connected the steering shaft, such as by connecting with the inner column tube. For example, a suitable bracket may connect the drive member to the inner column tube. The column housing may have one or more slots or other cut-outs that receive the bracket (e.g., a longitudinal slot in a bottom portion of the column housing may expose the inner column tube). The drive member may be elongated. For example, it may be a rod. It may have threads. It may have teeth. It may have some other structure for meshingly engaging a gear or other drive mechanism associated with the motor of the telescoping motor sub-assembly. The drive member may include a suitable mechanism for limiting the amount of longitudinal travel. For example, it may include an internally threaded nut that is threadedly and adjustably mounted on a threaded portion of the drive member (e.g., a drive rod) that provides an adjustable stop to limit linear movement of the member.

Figure 1B:
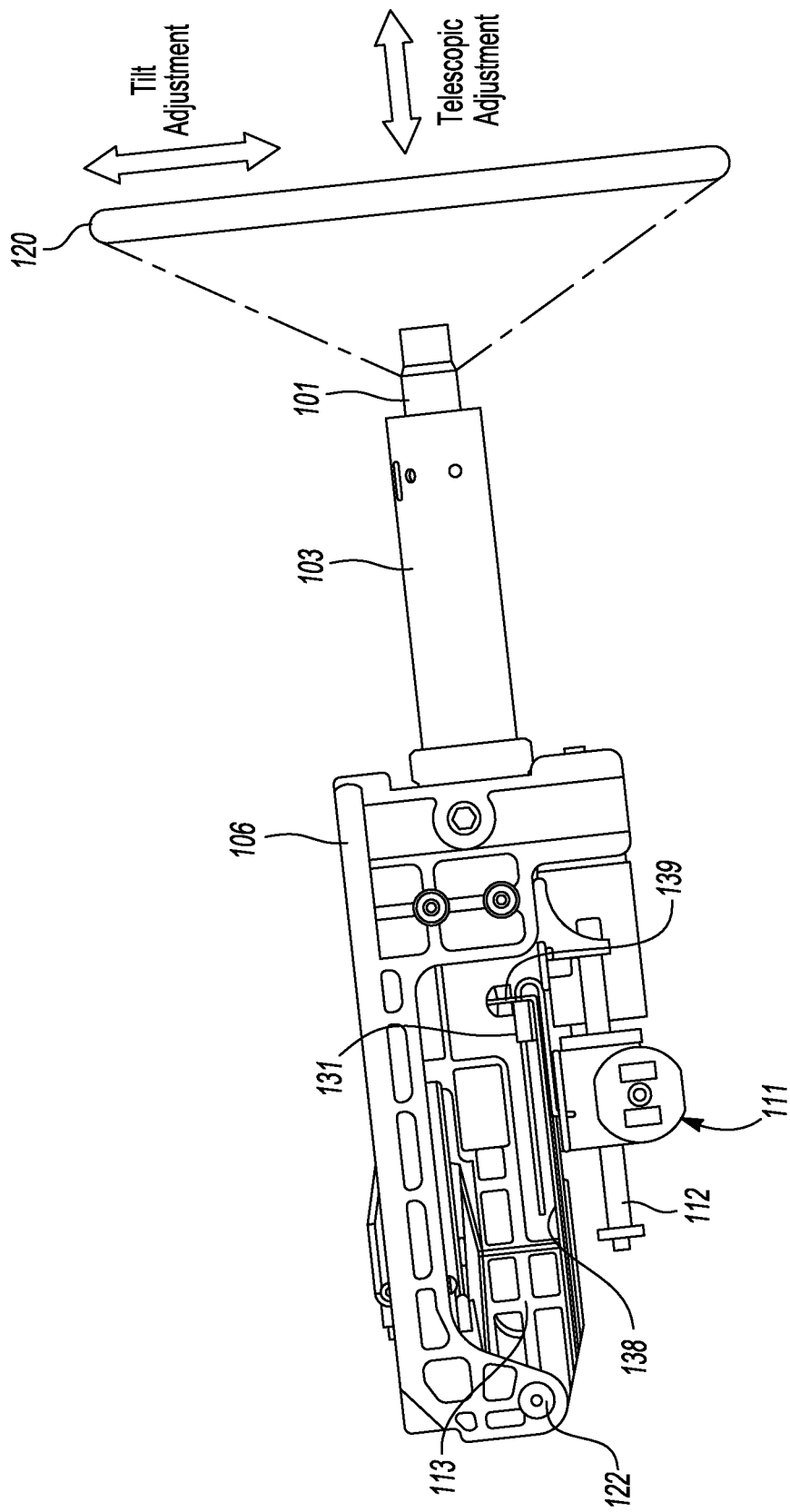
FIG. 1b is a side view of another collapsible steering column assembly of another embodiment of the present teachings.

When installed into the overall assembly of the present teachings, the telescoping motor sub-assembly may include suitable structure for attaching to an energy absorption device, a bracket for the energy absorption device, a column housing or any combination thereof. The telescoping motor sub-assembly may have a housing structure that includes a pair of opposing spaced walls, at least one of the opposing spaced walls will be adapted to releasably attach to the column housing. This may be done by providing a structure at an end of a wall of the telescoping motor subassembly mounting structure that allows for it to detach from the column housing after a predefined load has been obtained. For example, the structure may have include two or more tines with a notch defined between the tines. The tines are such that they flank a fastener upon installation (e.g., the fastener may be positioned within a notch that has generally opposing projections), with the tines facing in a rearward direction. An opening is thus defined in the housing of the telescoping motor sub-assembly which allows it to break free from the fastener in the event an impact exceeding a predefined load is experienced. The bracket may include a portion that cooperates with one or more other structural elements (e.g., a structure selected to have a predetermined coefficient of friction that is relatively low as compared with adjoining materials, (such as one or more coating plates (see, e.g., U.S. Pat. No. 7,350,816 (FIG. 1B and associated discussion))) for allowing a detachment of the bracket from the column housing after the predefined load is realized. Other approaches may be employed as well. For example, instead of tines, a thinned section or a section otherwise configured to rupture upon exposure to the predefined load may be employed. Structures such as shown in U.S. Pat. No. 7,410,190 (incorporated by reference) may be employed (see, e.g., Examples 1 and 7).

The teachings also envision employing at least one plastically deformable energy absorption device element (e.g., a bend plate) adapted to be housed (e.g., nestingly, matingly or otherwise) at least partially within the telescoping motor subassembly, or carried at least partially on the telescoping motor subassembly and being fixed in place to the column housing during normal operation for maintaining the steering column assembly in an operational position. The energy absorption device may have one free end and an attachment portion spaced from the free end that is fixed in place (e.g., attached to the assembly herein in a manner that prevents its removal without destruction of the energy absorption device, without deliberately removing any fastener or other device that attaches the attachment portion to the assembly, or both). For example, the energy absorption device may be such that the attachment portion is located at an opposite end from the free end. The energy absorption device may be an elongated metallic member. The energy absorption device may have at least one relative flat surface. The energy absorption device may have opposing generally flat surfaces. The energy absorption device may be a metallic strip. Optionally the strip may have an elongated slot along at least a portion of its length. For example, a slot may be employed to receive a fastener, a tang or some other structure for securing the strip in the assembly. The strip may have a free end that is closed. As seen, the strip may be a folded plastically deformable energy absorption strip having a first downward disposed bend portion, a first elongated portion that is generally parallel with the column housing flange and disposed below it, a second bend portion that folds the strip around the rearward facing end of the column housing flange and a second elongated portion that is generally parallel with the first elongated portion and disposed about the column housing flange.

The energy absorption device may be dimensioned to be wider in cross-section than it is tall (e.g., it may have a ratio of width to thickness of at least about 1.5, 3:1, 5:1, 10:1, 20:1, 30:1 or higher). The energy absorption device element may have a generally continuous shape and/or cross-sectional profile along its length. The energy absorption device element may have a varying shape and/or cross-sectional profile along its length. It may have a bulbous free end. The energy absorption device element may include a portion that includes or adjoins the free end that has a generally continuous shape and/or cross-sectional profile along a major portion of its length (e.g., greater than 50%, 65%, 80% or higher) and an attachment end portion that differs in shape from the generally continuous shape and/or cross-sectional profile portion. The energy absorption device element may have a thickness that ranges from about 0.8 mm to 3 mm. The energy absorption device may be made of a steel (e.g., a plain carbon steel (such as SAE 1008, 1010 or otherwise), an alloy of steel that includes a metal in addition to iron, or otherwise).

In one aspect, the energy absorption device element may be such that it will be disposed within or carried on at least a portion of the telescoping motor subassembly. For example, it may be such that it folds over and bears against a bearing end of an h-bracket or like structure. It may be such that it is otherwise secured to an upper surface of the telescoping motor subassembly. For example, it may have an end that is folded to be received in a slot of the telescoping motor subassembly. During a secondary impact, upon attainment of a predefined load, the energy absorption device element may initially translate, elastically deform, and after a predefined load has been reached will begin plastic deformation (e.g., under a compressive force or a tensile force). Such plastic deformation is envisioned to contribute substantially to absorption of energy from the secondary impact. The energy absorption device element may be fastened at one or more locations along its length to another structure with the assembly (e.g., to the inner column tube, to the column housing, to the telescope motor subassembly, or otherwise).

Examples of suitable devices that can be employed for an energy absorption device include those as described in U.S. Pat. No. 5,547,221, incorporated by reference (see e.g., FIGS. 1-8 and associated discussion); U.S. Pat. No. 7,332,610 incorporated by reference (see e.g., FIGS. 3 and 5 and associated discussion).

The teachings herein also contemplate methods of making and/or installing the assemblies described. Thus, the elements as described may be assembled in a manner to achieve the described assembly. The teachings envision providing an assembly as described herein for installation into an automotive vehicle. For example, the teachings include attaching the top bracket to a cross-vehicle beam, to an instrument panel or both. Such attaching may be for positioning the described top bracket above or below the cross-vehicle beam and/or the instrument panel. The teachings envision providing for installation into an automotive vehicle (e.g., by attaching to a cross-vehicle beam, an instrument panel or both) an assembly in accordance with the present teachings.

The teachings also contemplate the methods that occur in operation of the assemblies described. For example, the teachings envision providing an assembly including a plastically deformable energy absorption device adapted to be housed at least partially within the telescoping motor subassembly mounting structure (e.g., within an "h" shaped bracket) and being fixed in place to the column housing during normal operation for maintaining the steering column assembly in an operational position. In the event of an impact load to the steering shaft exceeding a predetermined impact load, the energy absorption device will yield plastically and absorb energy due to the impact load, with the telescoping motor subassembly remaining connected with the column housing.

Referring now to the drawing figures. FIGS. 1-6 illustrate examples of the structure and operation of an electric reach and rake steering column assembly for a vehicle in accordance with the present teachings. The assembly has a tilt adjustment feature and a telescopic adjustment feature. As to each such feature, there are associated motors. However, it is possible that one of the motors may be omitted (e.g., it is possible that the tilt adjustment is achieved manually without a motor).

The assembly is designed to help absorb energy during a collision, and in a secondary impact situation, when a driver impacts a steering wheel mounted on steering shaft of the assembly. In the following discussion, illustrative embodiments are described. One embodiment is shown in FIGS. 1*a*, 2*a*, and 3*a*-3*c*. Another embodiment is shown in FIGS. 1*b*, 2*b* and 4*a*-4*c*.

Referring first to the embodiment of FIGS. 1*a*, 2*a*, and 3*a*-3*c*, there is shown a steering wheel 20 mounted to a steering shaft 1. The assembly also includes an inner column tube 3 in which the steering shaft 1 is rotatably supported, such as by a bearing 2. In turn, the inner column tube 3 is mounted for linear telescopic movement within a column housing (e.g., a cast aluminum housing), generally indicated at 13, to provide the telescopic adjustment. The steering shaft 1 is coupled to a solid shaft 14 within the column housing 13 to rotate therein. A key lock collar 15 is mounted at one end of the shaft 14. A bearing 16 is also mounted on the shaft 14 to rotatably support the shaft 14 within the column housing 13.

The column housing 13 is pivotally supported by a top bracket 6 which is fixed to the vehicle at a top surface of the bracket 6. The housing 13 is held between spaced steel spacers 5 mounted on a u-shaped part (e.g., a collar) of the bracket 6. The column housing 13 is pivotally connected to the top bracket 6 at a fixed pivot location 22 on the housing 13 to help provide the tilt adjustment. The tilt adjustment is motorized by a tilt motor and gearing subassembly, generally indicated at 17, in driving engagement with a tilt nut and gear subassembly 4 mounted on the top bracket 6.

The assembly also includes a telescopic motor and gearing subassembly, generally indicated at 11, which is supported on the column housing 13 by a pair of mounting subassemblies, generally indicated at 26, including hollow, h-shaped brackets 30. Each of the brackets 30 has an upper, rear-facing, open notch 27 and a pocket 28 for receiving and retaining a curved or bent bend plate 10. Each bend plate 10 provides tunable energy absorption. In other words, depending on the size, shape and material composition of the bend plates 10, the energy absorption characteristics of the bend plates 10 can be varied or adjusted.

Bolts 8 of the mounting subassemblies 26 extend through respective apertured end portions 24 of the bend plates 10. Each bolt 8 also extends through each notch 27 of each bracket 30 and through inner and outer coating plates 7*b* and 7*a*, respectively, to releasably secure the motor and gearing subassembly 11 to lower surfaces of integral bracket parts 38 (e.g., laterally projecting flanges) of the column housing 13. The coating plates 7*a* and 7*b* may comprise or be covered by a low friction material and are interposed between the top and bottom surfaces of the brackets 30, the outer surface of the bracket parts 38 (e.g., laterally projecting flanges) of the column housing 13 and the heads of the bolts 8 to reduce the friction between each of the surfaces which they contact. The amount of torque in securing the bolts 8 to the bracket parts 38 is variable to provide a "tunable" breakaway. Alternatively, the coating plates may be replaced with other breakaway mechanisms such as aluminum capsules retained by plastic shear pins.

The assembly further includes a drive member (e.g., a threaded rod) having a longitudinal axis, generally indicated at 12, in driving engagement with the telescopic motor and gearing subassembly 11 to linearly move the drive member (e.g., rod) 12 in a fore or aft direction generally parallel with the longitudinal axis of the shaft 1. As depicted, the drive member (e.g., rod) 12 may include (e.g., at or near one end) a threaded portion 32 which extends through a rotatable nut (not shown) of the subassembly 11. At another location along its length, the drive member may include an aperture or other suitable structure. When the nut of the subassembly rotates about the longitudinal axis of the drive member (e.g., rod) 12, the drive member linearly moves along its longitudinal axis to alternately push or pull the steering wheel in a fore or aft direction, such as by way of a telescopic bolt subassembly 9 secured at the opposite end of the drive member (e.g., rod) 12. A bolt of the subassembly 9 extends through a hole formed through a flattened portion 36 of the rod 12 opposite the threaded portion 32. In turn, the bolt of the subassembly 9 extends through an elongated slot (not shown) formed through the column housing 13 to fixedly secure the rod 12 to the inner column tube 3 to allow the telescopic motor and gearing subassembly 11 to adjust the linear position of the inner column tube 3 relative to the column housing 13. An internally threaded nut 34 may also be employed to threadedly and adjustably mount on the threaded portion 32 of the drive member (e.g., rod) 12 for providing an adjustable stop to limit linear movement of the drive member (e.g. rod) 12.

Referring again to FIGS. 1*a*, 2*a*, and 3*a*-3*c*, during a collision, the force of the driver's impact is transmitted through the collapsing steering wheel 20, through the steering shaft 1, to the collapsing inner column tube 3 which slides or telescopes into the housing 13 thereby causing the rod 12 to collapse or move the motor and gearing subassembly 11 thereby disengaging the subassembly 11 from the housing 13 via the adjustable breakaway mechanism as described above at the brackets 30. If required, after breakaway, but before energy absorption, an adjustable load delay may be provided by a variable gap between each bend plate 10 and its corresponding h-shaped bracket 30 during assembly of the system 10. After initial breakaway, the bend plates 10 do not function until they engage with their respective h-shaped brackets 30. The transmitted driver's impact is then absorbed by bending movement of the plates 10 within their respective pockets 28.

Referring next to the embodiment of FIGS. 1*b*, 2*b*, 4*a*-4*c*, 5 and 6, there is shown another embodiment within the present teachings. A steering wheel 120 is mounted to a steering shaft 101. The assembly also includes an inner column tube 103 in which the steering shaft 101 is rotatably supported by a bearing 102. In turn, the inner column tube 103 is mounted for linear telescopic movement within a housing (e.g., an aluminum casting housing), generally indicated at 113, to provide the telescopic adjustment. The steering shaft 101 is coupled to a solid shaft 114 within the housing 113 to rotate therein. As with the previous embodiment a key lock collar 115 may be mounted at one end of the shaft, and a bearing 116 may also be mounted on the shaft 114 to rotatably support the shaft within the housing 113. One or more spacer rings 118 may be employed along the length of the assembly for retaining rotatable components spaced apart from a wall in which the component resides.

Figure 2A:
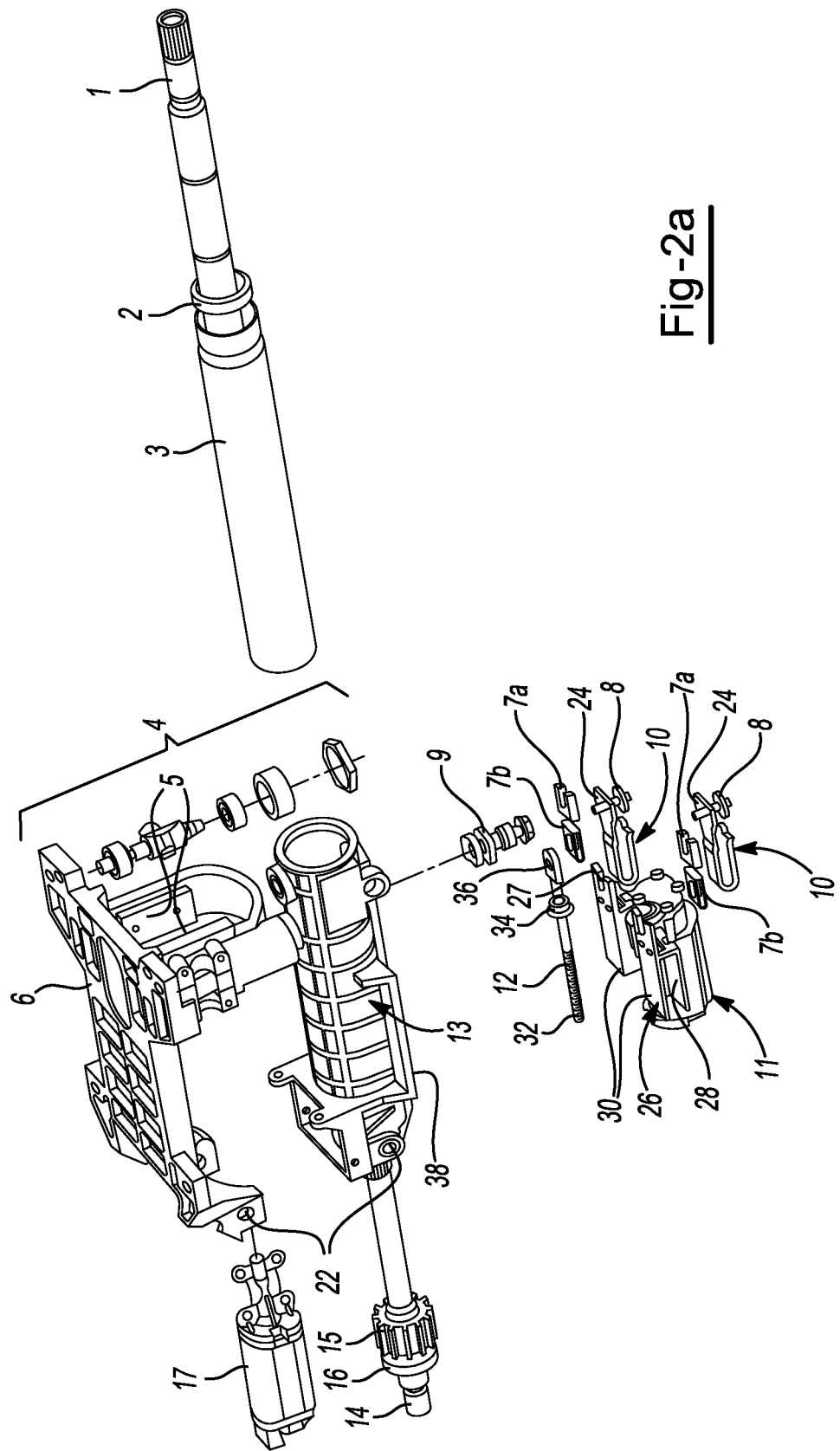
Figure 2B:
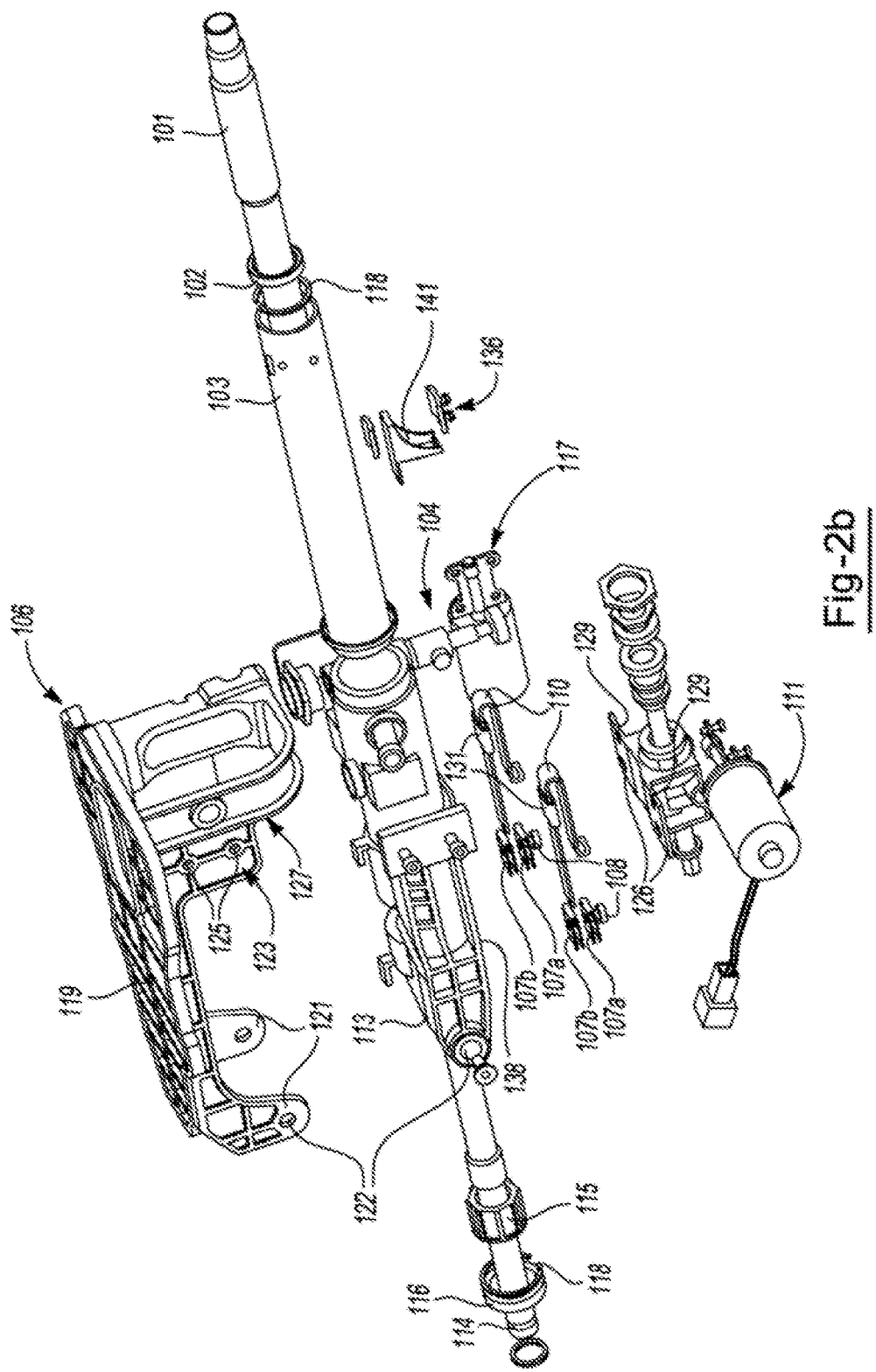
FIG. 2b is an exploded perspective view of the assembly of FIG. 1b.

The housing 113 is pivotally supported by a top bracket 106 (depicted in FIG. 2*b* as having an asymmetrical structure). The top bracket is depicted to have a top surface 119 (shown as having ribs), and a pair of spaced arms 121. One or more sidewalls 123 may depend downwardly from the bracket, and include apertures 125 or other suitable structures for mounting a component to it. The top bracket is fixed to the vehicle at the top surface 119 of the top bracket 106. The column housing 113 will penetrate through an elongated collar portion 127 that is sized within its interior to be larger than the corresponding outer portion of the column housing 113, so that the inner column housing can move up and down within the collar. Though not shown, lateral movement of the column housing within the collar may be restricted by a suitable spacer arrangement, as previously described. As seen, the collar may have an asymmetrical shape in a direction transverse to the longitudinal axis of the steering shaft. For example, the collar may be configured to receive components on one side of a longitudinal axis of the assembly that are part of a tilt motor and gearing subassembly. The column housing 113 is pivotally connected to the top bracket 106 at a fixed pivot location 122 on the column housing 113 to help provide the tilt adjustment. The tilt adjustment is motorized by a tilt motor and gearing subassembly, generally indicated at 117, in driving engagement (e.g., with a tilt nut and gear subassembly 104 mounted on the top bracket 106).

The assembly also includes a telescopic motor and gearing subassembly, generally indicated at 111, which is supported on the housing 113 by a pair of mounting subassemblies, generally indicated at 126. The mounting subassemblies may be part of a housing for a motor of the telescopic motor and gearing assembly; for instance, the housing is shown as having laterally extending wing portions, which are located on an upper part of the housing, and which include a notch 129 at a rearward facing end. It may also include a slot for receiving a portion (e.g., a bent end portion) of an energy absorption device element. As will be seen, a fastener (e.g., a bolt shown in combination with coating plates) can be employed to attach the mounting subassemblies to the column housing with one or more coating plates therebetween. By positioning the fastener within the notch, and applying suitable torque to the fastener, the notch allows for breakaway for the telescopic motor and gearing subassembly after a predefined load has been experienced in a secondary collision.

Figure 5:
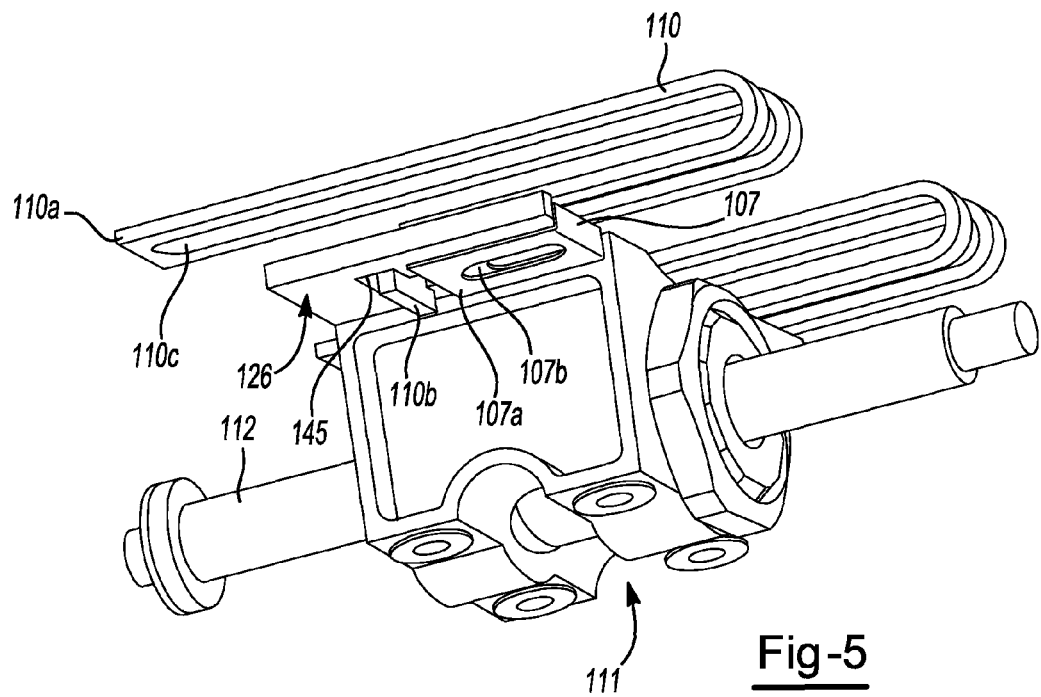
FIG. 5 is a perspective view of a portion of an assembly of the embodiment of FIGS. 1b, 2b and 4a-4c.
Figure 6:
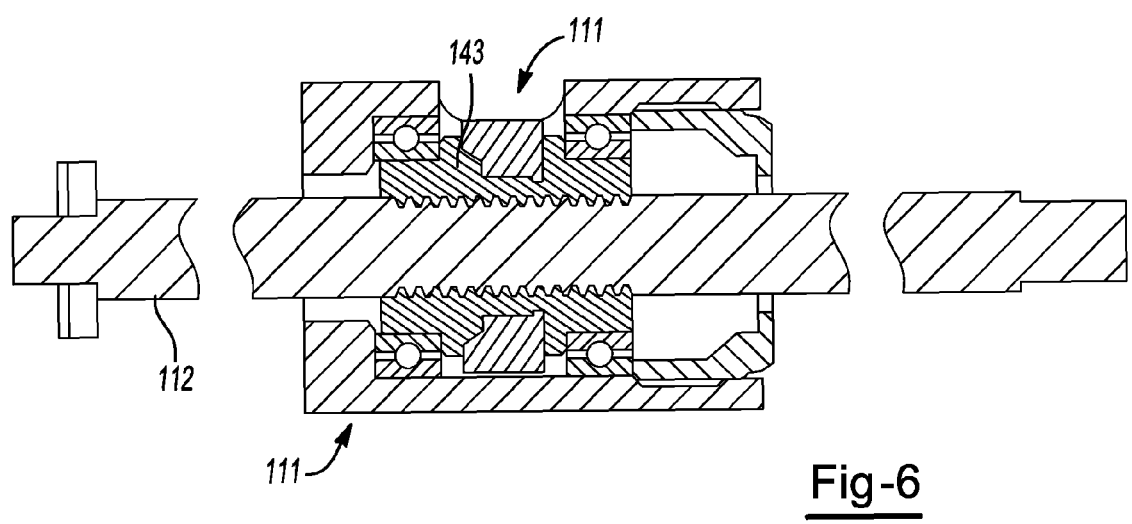
FIG. 6 is a longitudinal sectional view of a portion of FIG. 5.

As with the previous embodiment, a plastically deformable energy absorption device such as a curved or bent bend plate 110 is shown. In contrast with the previous embodiment, in which the energy absorption device element (e.g., bend plate) is deformed under a compressive force (e.g., applied at an end of the device element), in this embodiment, the energy absorption device (e.g., bend plate) is deformed under a tensile force. In the present illustration the energy absorption device is a folded strip in its normal installed state. The strip has a first end portion that is fixed in place to the assembly (e.g., to the inner column tube via a fastener 136 and bracket 139), and will remain fixed in place during a stroke occasioned by a secondary impact. As seen in FIG. 2b, fixation is achieved by forming a downward bend in the strip. The downward bend is connected to one of the mounting subassemblies 126, in a manner that is sufficiently secure that it will remain connected during a secondary impact. For example, as seen in FIG. 5, an end 110b may be retained within a slot 145 of a mounting structure. The strip folds over upon itself in its normal installed position, and has a free end 110a. The strip may also be adapted to bear against the column housing, such as along a bracket structure (e.g., a lateral flange 138) of the column housing (e.g., at an end of the lateral flange). A suitable retention guide structure 131 or other like structure may substantially circumscribe the perimeter of the energy absorption device. The retention guide structure may be configured and positioned so that it will bear against a generally vertical wall 139 that projects away (e.g., downwardly) from the lateral flange 138. The retention guide structure may be elongated and hollow, and will be configured to constrain the energy absorption device so that the absorption device bears against the lateral flange during an impact. The retention guide structure may be a separable plastic device that is clipped or otherwise mounted to the column housing. For example, it may be clipped into an opening formed in the lateral flange 138. During impact, the energy absorption device can thus be pulled around the flange of the column housing (e.g., at a rearward facing end of the flange), while being retained relative to the column housing by the retention guide structure.

The material for the retention guide structure may be selected to apply a predetermined amount of friction. It may be a suitable plastic. It may also be configured to provide a stop that prevents further travel of the strip as the free end of the strip contacts it.

Bolts 108 of the mounting subassemblies 126 may extend through respective apertured end portions of the energy absorption device (e.g., bend plates 110). Each bolt 108 may also extend through each notch 129 and through inner and outer coating plates 107b and 107a, respectively, to releasably secure the telescopic motor and gearing subassembly 111 to lower surfaces of integral bracket parts 138 of the housing 113. The coating plates 107a and 107b may comprise or be covered by a low friction material and be interposed between the mounting subassemblies 126, and the housing 113. The amount of torque in securing the bolts 108 to the flange 138 is variable to provide a "tunable" breakaway. Alternatively, the coating plates may be replaced with other breakaway mechanisms such as aluminum capsules retained by plastic shear pins. In FIG. 5, the bend plate is shown to have an elongated slot 110c. An end 110b of the bend plate 110 may penetrate an opening 145 in the mounting subassembly 126, and abut against the subassembly when a tensile force is applied.

The assembly further includes a threaded telescope drive member (e.g., a rod) having a longitudinal axis, generally indicated at 112, in driving engagement with the telescopic motor and gearing subassembly 111 to linearly move the drive member (e.g., rod) 112. The drive member, in turn, is connected with the inner column tube, such as by way of a bracket 141. Driving may be achieved by way of a threaded nut 143 (e.g., a nut overmolded with a plastic gear that engages a motor shaft). See FIG. 6. As shown, the motor has a shaft that engages the nut 143 and the nut engages telescope drive member in a direction generally transverse to the longitudinal axis of the telescope drive member.

Referring again to FIGS. 1b, 2b, and 4a-4c, during a collision, the force of the driver's impact is transmitted through the collapsing steering wheel 120, through the steering shaft 101, to the collapsing inner column tube 103 which slides or telescopes into the housing 113 thereby causing the drive member (e.g., rod 112) to collapse or move the motor and gearing subassembly 111 thereby disengaging the subassembly 111 from the housing 113 via the adjustable breakaway mechanism as described above at the brackets 141.

If required, after breakaway, but before energy absorption by the energy absorption device elements (e.g., bend plate), an adjustable load delay may be provided by setting a suitable gap between the energy absorption device elements (e.g., bend plate) and the structure against which it is to be deformed. Otherwise, after initial breakaway, the energy absorption device elements will plastically deform and thereby absorb energy from the impact.

As seen in FIGS. 3a-3c and 4a-4c, the energy absorption device element may be a folded strip, which folds about a bend, and wherein the location of the bend along the length of the strip changes as the strip absorbs energy.

As seen from the above, collapse of a steering column assembly is possible without reliance upon friction as the primary mode of energy absorption. Rather, the teachings herein rely primarily upon plastic deformation for absorbing energy from secondary impact. It is thus possible that reliance upon friction may be at most incidental, as compared with reliance upon plastic deformation. Energy absorption may be essentially free of reliance upon friction. Collapse of a steering column assembly is possible without reliance upon wires as a form of an energy absorption device. The energy absorption device may be a structure that is not a wire. Further, though energy absorption is as a result of plastic deformation of the energy absorption devices described herein, such plastic deformation may be deformation that occurs without any permanent elongation of the energy absorption device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. By way of example, without limitation, orientations of components of the FIG. 1a embodiment may be employed in the FIG. 1b embodiment and vice versa. Rib structures shown in one embodiment may be adapted and used where not shown in another embodiment. Threads or splines shown may be substituted with another structure for causing an interference fit, a friction fit, or both.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described.

What is claimed is:

1. An internally collapsing steering column assembly for an automotive vehicle comprising:
   a. an inner column tube;
   b. a steering shaft supported for rotation at least in part by the inner column tube and having a longitudinal axis,
   c. a top bracket adapted for receiving at least a portion of the steering shaft and for mounting the steering column assembly within the automotive vehicle;
   d. a telescoping motor subassembly adapted for selectively driving the steering shaft in a fore or aft direction generally along the longitudinal axis;
   e. a tilt subassembly that is adapted for selectively raising or lowering the steering shaft;
   f. a column housing that is pivotally coupled with the top bracket and is adapted to permit steering shaft tilt adjustment by way of the tilt subassembly;
   g. a telescoping motor subassembly mounting structure that is operatively coupled during normal operation to the column housing, the telescoping motor subassembly and the inner column tube, wherein the telescoping motor subassembly mounting structure is adapted to detach from the column housing and translate along the column housing in an event of an impact exceeding a predetermined load; and
   h. a plastically deformable energy absorption device adapted to be carried at least partially by the telescoping motor subassembly mounting structure and being fixed in place relative to the column housing during normal operation for maintaining the steering column assembly in an operational position, wherein the energy absorption device absorbs energy by plastic deformation during impact after the telescoping motor subassembly mounting structure starts to translate along the column housing, and wherein during the impact, the column housing remains in a generally fixed position and energy is absorbed through the telescoping motor subassembly;
   wherein the steering column assembly is an internally collapsing steering column assembly wherein the inner column tube telescopically translates into the column housing during the impact; and
   wherein the column housing is pivotally coupled with the top bracket at their respective forward ends by a pivotal connection with downward depending arms of the top bracket, and wherein the top bracket includes a collar at a rearward end within which the column housing, the inner column tube or both are positioned.

2. The assembly of claim 1, wherein the telescoping motor subassembly mounting structure is at least partially integrated with the telescoping motor subassembly and is configured to include a generally planar first portion having a first end a second end, a second portion that includes a free end, where the second portion attaches to the generally planar first portion, and a pocket that is defined between the first end and the free end and that receives the energy absorption device.

3. The assembly of claim 2, wherein the telescoping motor subassembly mounting structure includes a structure that is generally shaped as a lower case letter h.

4. The assembly of claim 1, wherein the telescoping motor subassembly adapted for selectively driving the steering shaft in a fore or aft direction generally along the longitudinal axis includes an elongated drive member having a longitudinal axis.

5. The assembly of claim 4, wherein the elongated drive member is a rod.

6. The assembly of claim 5, wherein the telescoping motor subassembly includes a motor having an output shaft that is oriented generally transverse relative to the longitudinal axis of the elongated drive member.

7. The assembly of claim 1, wherein the energy absorption device is a metal strip.

8. The assembly of claim 1, wherein the column housing, the top bracket or both are cast aluminum structures.

9. The assembly of claim 1, wherein the telescoping motor subassembly mounting structure includes a rearward facing portion that includes a plurality of tines that flank a notch and that engage a coating plate in normal operation, and during an impact exceeding a predetermined first impact load becomes dislodged from the coating plate.

10. The assembly of claim 1, wherein the energy absorption device is configured to yield from tension from a second impact load.

11. The assembly of claim 1, wherein the assembly has a collapse stroke of at least about 70 mm.

12. The assembly of claim 1, wherein the collar accommodates upward and downward translation of the column housing, the inner column tube or both.

13. An internally collapsing steering column assembly for an automotive vehicle comprising:
  a. an inner column tube;
  b. a steering shaft supported at least in part by the inner column tube and having a longitudinal axis,
  c. a top bracket adapted for receiving at least a portion of the steering shaft and for mounting the steering column assembly within the automotive vehicle, the top bracket including a pair of spaced apart arms at a forward end and a collar at a rearward end;
  d. a telescoping motor subassembly adapted for selectively driving the steering shaft in a fore or aft direction generally along the longitudinal axis;
  e. a motorized tilt subassembly that is adapted for selectively raising or lowering the steering shaft, and being housed at least partially within the collar;
  f. a column housing having a forward end and a rearward end, the column housing being pivotally coupled with the pair of spaced apart arms of the top bracket at the forward end of the column housing, and being adapted to permit steering shaft tilt adjustment by way of the tilt subassembly, the column housing including a laterally projecting flange having a rearward facing end, on each side of the column housing;
  g. a telescoping motor subassembly mounting structure that is coupled during normal operation to the column housing, the telescoping motor subassembly and the inner column tube, wherein the telescoping motor subassembly mounting structure is adapted so that the telescoping motor subassembly detaches from the column housing and translates along the an opposing surface of the column housing in an event of an impact exceeding a predetermined load; and
  h. a folded plastically deformable energy absorption strip adapted to be disposed at least partially on the telescoping motor subassembly mounting structure and being fixed in place to the column housing by being folded over the rearward facing end of the laterally projecting flange of the column housing during normal operation for maintaining the steering column assembly in an operational position, wherein the energy absorption strip absorbs energy by plastic deformation caused by tension during the impact, such that the energy absorption strip is pulled around the rearward facing end of the laterally projecting flange of the column housing after the telescoping motor subassembly starts to translate along the column housing, and wherein during the impact, the column housing remains in a generally fixed position and the inner column tube telescopically translates into the column housing.

14. The assembly of claim 13, wherein the telescoping motor subassembly mounting structure includes a pair of flat surfaces on an upper portion of the telescoping motor subassembly, each flat surface of the pair having a rearward end with a notch defined therein, and a structure for receiving an end of a respective energy absorption strip, and wherein each upper portion is held in place relative to the column housing during normal operation by way of a coating plate.

15. The assembly of claim 14, wherein each energy absorption strip is held in place relative to the laterally projecting flange of the column housing by a retention guide structure that is secured to the laterally projecting flange.

16. An internally collapsing steering column assembly for an automotive vehicle comprising:
  a. an inner column tube;
  b. a steering shaft supported at least in part by the inner column tube and having a longitudinal axis,
  c. a top bracket adapted for receiving at least a portion of the steering shaft and for mounting the steering column assembly within the automotive vehicle, the top bracket including a pair of spaced apart arms at a forward end and a collar at a rearward end;
  d. a telescoping motor subassembly adapted for selectively driving the steering shaft in a fore or aft direction generally along the longitudinal axis;
  e. a motorized tilt subassembly that is adapted for selectively raising or lowering the steering shaft, and being housed at least partially within the collar;
  f. a column housing having a forward end and a rearward end, the column housing being pivotally coupled with the pair of spaced apart arms of the top bracket at the forward end of the column housing, and being adapted to permit steering shaft tilt adjustment by way of the motorized tilt subassembly, the column housing including a laterally projecting flange having a rearward facing end, on each side of the column housing;
  g. a telescoping motor subassembly mounting structure that is coupled during normal operation to the column housing, the telescoping motor subassembly and the inner column tube, wherein the telescoping motor subassembly mounting structure is adapted so that the telescoping motor subassembly detaches from the column housing and translates along an opposing surface of the column housing in an event of an impact exceeding a predetermined load, and wherein the telescoping motor subassembly mounting structure includes coating plates that provide a relatively low friction surface and allow the telescoping motor subassembly to detach from its normal operational position; and
  h. a folded plastically deformable energy absorption strip having a first downward disposed bend portion, a first elongated portion that is generally parallel with the laterally projecting flange of the column housing and disposed below it, a second bend portion that folds the energy absorption strip around the rearward facing end of the column housing flange and a second elongated portion that is generally parallel with the first elongated portion and disposed about the laterally projecting flange of the column housing, the energy absorption strip being adapted to be disposed at least partially on the telescoping motor subassembly mounting structure and being fixed in place to the column housing during normal operation for maintaining the steering column assembly in an operational position, wherein the energy absorption strip absorbs energy by plastic deformation caused by tension during impact, such that the energy absorption strip is pulled around the rearward facing end of the laterally projecting flange of the column housing after the telescoping motor subassembly starts to translate along the column housing, and wherein during the impact, the column housing remains in a generally fixed position and the inner column tube telescopically translates into the column housing.

* * * * *